United States Patent
Alshuwair et al.

(10) Patent No.: US 12,072,677 B2
(45) Date of Patent: Aug. 27, 2024

(54) SYSTEM AND METHOD FOR PREEMPTIVE SHUTDOWN OF UTILITIES, FACILITIES OR SYSTEMS IN SMART CITIES

(71) Applicant: SAUDI ARABIAN OIL COMPANY, Dhahran (SA)

(72) Inventors: Sami A. Alshuwair, Dhahran (SA); Muhammad S. Aljuaid, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 957 days.

(21) Appl. No.: 17/061,888

(22) Filed: Oct. 2, 2020

(65) Prior Publication Data

US 2022/0107611 A1  Apr. 7, 2022

(51) Int. Cl.

| | |
|---|---|
| *G05B 13/02* | (2006.01) |
| *G06Q 10/0631* | (2023.01) |
| *G06Q 10/10* | (2023.01) |
| *G06Q 30/018* | (2023.01) |
| *G06Q 30/0204* | (2023.01) |
| *G06Q 50/26* | (2012.01) |
| *H04W 76/10* | (2018.01) |

(52) U.S. Cl.
CPC ... *G05B 13/0265* (2013.01); *G06Q 10/06315* (2013.01); *G06Q 10/10* (2013.01); *G06Q 30/0185* (2013.01); *G06Q 30/0205* (2013.01); *G06Q 50/265* (2013.01); *H04W 76/10* (2018.02)

(58) Field of Classification Search
CPC ......... G06Q 10/06316; G06Q 10/0635; G06Q 30/0205
See application file for complete search history.

(56) References Cited

U.S. PATENT DOCUMENTS

| | | |
|---|---|---|
| 7,047,114 B1 | 5/2006 | Rogers |
| 7,471,195 B2 | 12/2008 | Roark et al. |
| 9,742,709 B1 | 8/2017 | Laich |

(Continued)

FOREIGN PATENT DOCUMENTS

| | | |
|---|---|---|
| CN | 202373041 U | 8/2012 |
| CN | 203462559 U | 3/2014 |

(Continued)

OTHER PUBLICATIONS

Chen, Rui et al., "Coordination in Emergency Response Management: Developing a framework to analyze coordination patterns occurring in the emergency response life cycle", Communications of the ACM, vol. 51, No. 5, May 2008, pp. 66-73) (8 pages).

(Continued)

*Primary Examiner* — Vincent H Tran
(74) *Attorney, Agent, or Firm* — Osha Bergman Watanabe & Burton LLP (57) ABSTRACT

A method for a preemptive and graceful shutdown of utilities, facilities or systems in smart cities includes detecting a hazard at external entities based on collected information, determining whether a predefined shutdown plan for the detected hazard exists, generating a new shutdown plan, based on predefined criteria, for the detected hazard, and (Continued)

shutting down the at least one component of the external entities based on the new shutdown plan or the predefined shutdown plan.

20 Claims, 6 Drawing Sheets

(56) References Cited

U.S. PATENT DOCUMENTS

| | | | |
|---|---|---|---|
| 9,992,654 | B2 | 6/2018 | Kodaypak et al. |
| 10,026,279 | B1* | 7/2018 | Beller .................. G08B 25/10 |
| 2006/0047543 | A1 | 3/2006 | Moses |
| 2012/0179421 | A1 | 7/2012 | Dasgupta |
| 2017/0357563 | A1* | 12/2017 | Shah .................. G06Q 10/0639 |
| 2018/0053401 | A1 | 2/2018 | Martin et al. |
| 2019/0086233 | A1* | 3/2019 | Comfort ................ G01F 15/00 |
| 2019/0340912 | A1 | 11/2019 | Sellathamby et al. |
| 2020/0213852 | A1* | 7/2020 | Obaidi ................ H04L 9/3239 |
| 2021/0264790 | A1* | 8/2021 | Ganesan ................ G08G 1/166 |
| 2021/0312468 | A1* | 10/2021 | Jones, III ............ G06Q 30/018 |
| 2021/0357456 | A1* | 11/2021 | Hale ........................ G01W 1/10 |

FOREIGN PATENT DOCUMENTS

| | | | | |
|---|---|---|---|---|
| CN | 205608773 U | 9/2016 | | |
| CN | 103578228 B | 8/2017 | | |
| CN | 111062683 A | 4/2020 | | |
| CN | 111354165 A | 6/2020 | | |
| KR | 20080007821 A | 1/2008 | | |
| KR | 100983338 B1 | 9/2010 | | |
| KR | 101080104 B1 | 11/2011 | | |
| WO | WO-2019067630 A1 * | 4/2019 | ............ | G05B 15/02 |
| WO | 2019126515 A1 | 6/2019 | | |

OTHER PUBLICATIONS

Baharin, Safiza Suhana Kamal et al., "Disaster Management in Malaysia: An Application Framework of Integrated Routing Application for Emergency Response Management System", IEEE Computer Society, 2009 International Conference of Soft Computing and Pattern Recognition, Feb. 2009, pp. 716-719 (4 pages).

"Smart City Resilience: Learning from Emergency Response and Coordination in Japan", GSMA Smart Cities, Japan Meteorological Agency, Jan. 2013 (5 pages).

Brazzola, Nicoletta and Simon E. M. Helander, "Five Approaches to Build Functional: Early Warning Systems", United Nations Development Programme, 2018 (67 pages).

Nazarov, Emin, "Emergency Response Management in Japan: Final Research Report", Asian Disaster Reduction Center, Visiting Researcher Program FY2011A, Oct. 2011, URL:<https://www.adrc.asia/aboutus/vrdata/finalreport/2011A_AZE_Emin_FRR.pdf> (47 pages).

Hayden, Tyler, "Edison to Shut Down Power During Extreme Fire Weather: Drastic Measure Deemed 'Lesser of Two Evils'", Santa Barbara Independent, Aug. 2018, URL:<https://www.independent.com/2018/08/09/edison-shut-down-power-during-extreme-fire-weather/> (5 pages).

International Search Report and Written Opinion of the International Searching Authority issued in corresponding International Application No. PCT/US2021/053385 mailed on Dec. 22, 2021 (14 pages).

Dragoicea Monica et al: "Real Time Agent based Simulation for Smart City Emergency Protocols", 2014 18th International Conference on System Theory, Control and Computing (ICSTCC), IEEE, Oct. 17, 2014, pp. 187-192 (6 pages).

* cited by examiner

SYSTEM AND METHOD FOR PREEMPTIVE SHUTDOWN OF UTILITIES, FACILITIES OR SYSTEMS IN SMART CITIES

BACKGROUND

Globally, urbanization is advancing at a rapid pace. As urbanization has become a trend, cities require continuous energy supply for industrial and commercial activities, transportation, infrastructure, water distribution, and food production. It is estimated that by 2028, there will be over 4 billion connected Internet of Things (IoT) devices in commercial smart buildings. A smart city will have the ability to integrate multiple technological solutions to manage the city's facilities and utilities.

SUMMARY

In general, in one aspect, the invention relates to a method for a preemptive shutdown. A method includes detecting a hazard at one of a plurality of entities based on collected information from the plurality of entities of a smart city, determining whether the detected hazard requires preemptive shutdown of at least one component of one of the plurality of entities at which the hazard is detected, determining whether a predefined shutdown plan exists for the detected hazard at the one of the plurality of entities, when a predefined shutdown plan does not exist, generating a new shutdown plan, based on predefined criteria, for the detected hazard at the one of the plurality of entities, and shutting down the at least one component of the one of the plurality of entities based on the new shutdown plan or the predefined shutdown plan.

In general, in one aspect, the invention relates to a system for monitoring a plurality of entities of a smart city. A system includes a core module configured to collect data from a plurality of external entities outside of the system, a hazards analytics module configured to detect and identify a hazard in one of the plurality of entities based on the collected data, and a module for creation of a new shutdown plan based on predefined criteria, when a predefined shutdown plan is unavailable for the identified hazard, wherein the system is configured to shutdown at least one component in the one of the plurality of entities in which the hazard is identified.

In general, in one aspect, the invention relates to a non-transitory computer readable comprising program instructions, that when executed, are configured to perform a method for monitoring a plurality of entities of a smart city. The instructions, when executed, are detecting a hazard based on collected information from a plurality of entities of a smart city, determining whether the detected hazard requires preemptive shutdown of at least one component of one of the plurality of entities at which the hazard is detected, when preemptive shutdown is required: determining whether a predefined shutdown plan exists for the detected hazard at the one of the plurality of entities, when a predefined shutdown plan does not exist, generating a new shutdown plan, based on predefined criteria, for the detected hazard at the one of the plurality of entities, and shutting down the at least one component of the one of the plurality of entities by following a procedure laid out in the new shutdown plan or the predefined shutdown plan.

DETAILED DESCRIPTION

Specific embodiments disclosed herein will now be described in detail with reference to the accompanying figures. Like elements in the various figures are denoted by like reference numerals for consistency Like elements may not be labeled in all figures for the sake of simplicity.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

One or more embodiments disclosed herein are directed towards a hazards management system in a smart city. Due to the increasing amount of devices connected to Internet of Things (IoT) in commercial smart buildings, smarts cities have the ability to integrate multiple technological solutions to manage the city's agencies, facilities and utilities. Such agencies, facilities, and utilities, which may all be connected to an IoT network that is used to efficiently run the smart city and monitor the city's assets, may experience hazards that are dangerous to the safety or efficiency of the smart city. In one or more embodiments, these hazards must be predicted when possible, and monitored for preemptive shutdown of components of the agencies, utilities, and/or facilities during ongoing hazards. It would be apparent to one of ordinary skill in the art that the concept presented here can be also applied in cities lacking advanced technologies such as IoT networks. In this case, some of the steps or components mentioned here might be performed by other means such as manual process.

Figure 1:
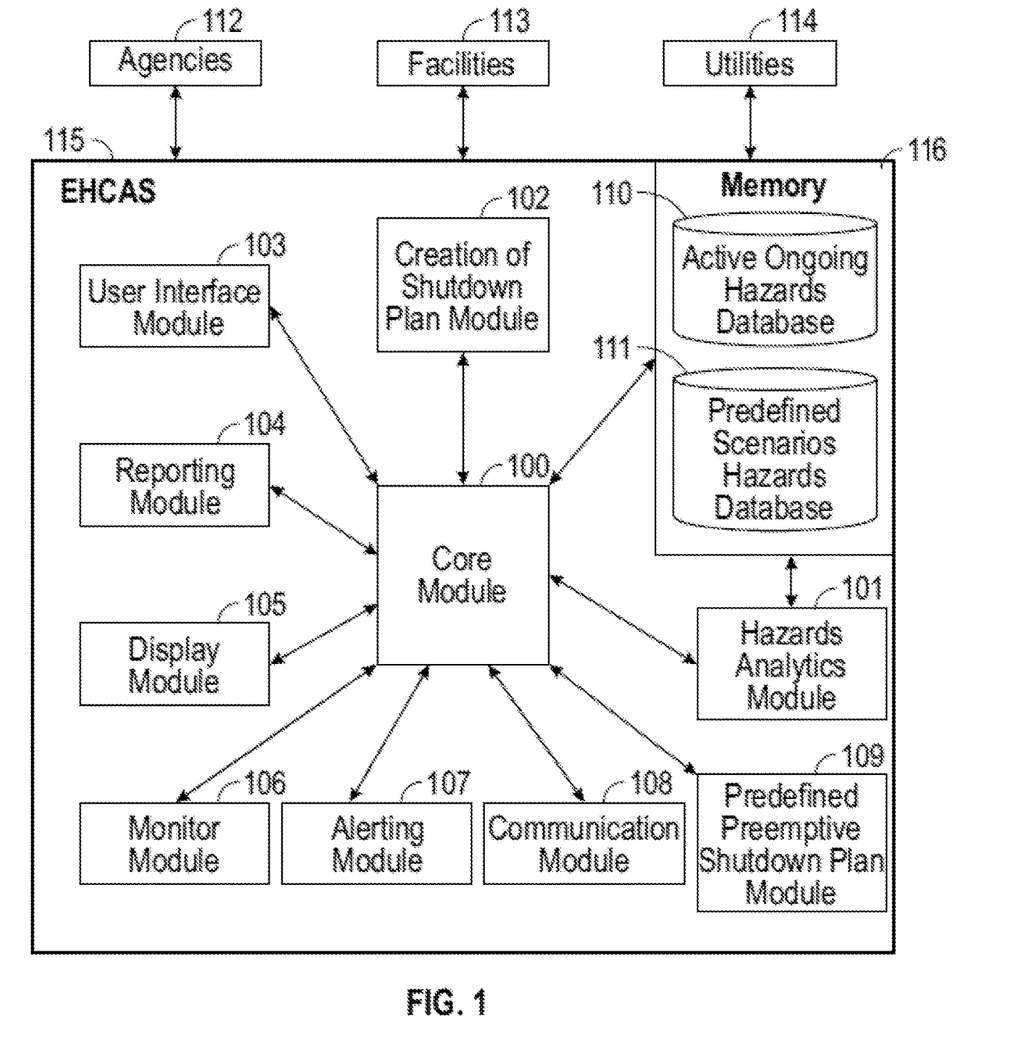
FIG. 1 shows an example architecture of an Emergency and Hazards Containment Advisory System (EHCAS) in accordance with one or more embodiments disclosed herein.
Figure 6A:
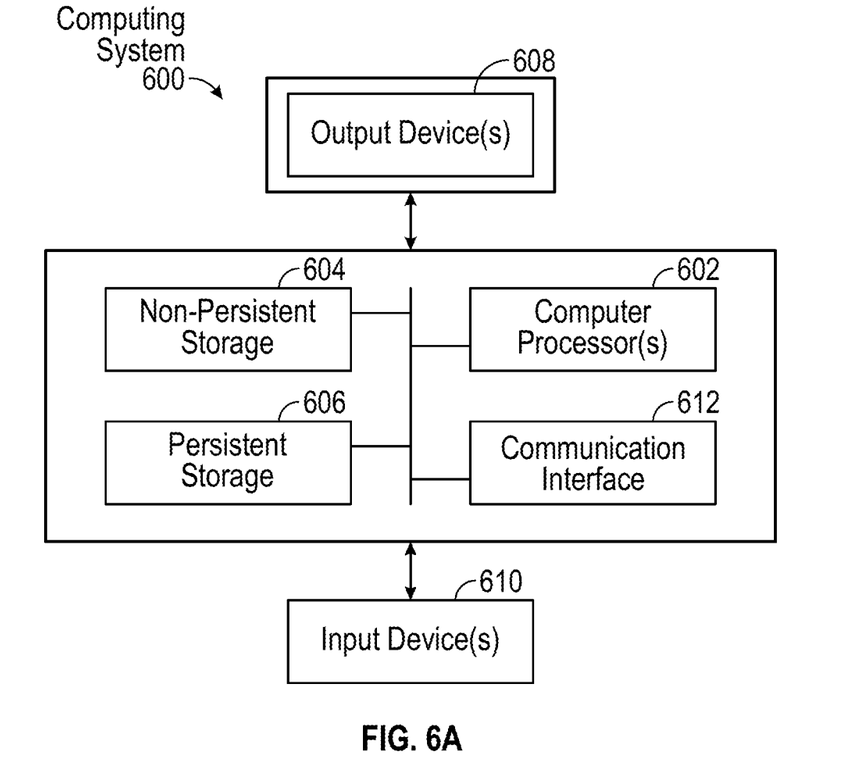
FIGS. 6A and 6B show a computer system in accordance with one or more embodiments disclosed herein.
Figure 6B:
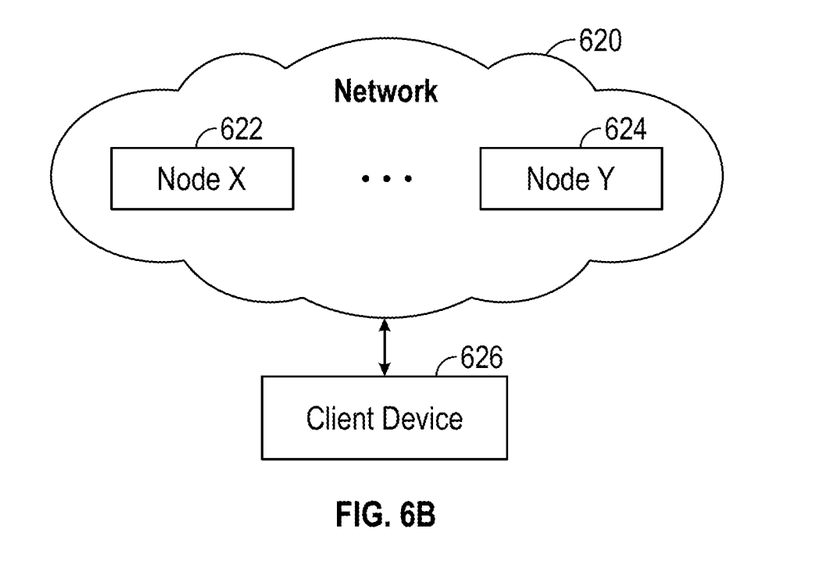

FIG. 1 shows a system for detecting and monitoring hazards in a smart city in accordance with one or more embodiments disclosed herein. The system includes an Emergency and Hazards Containment Advisory System (EHCAS) (115) operatively connected to various facilities (113), utilities (114) and agencies (112) of a smart city. The EHCAS is a system made up of both hardware and software that is used to communicate with external entities of the smart city regarding potential and ongoing hazards. In one or more embodiments, the EHCAS (115) may be implemented as a computer system, such as that shown in FIG. 6.

A smart city may be any city that uses technology to increase operational efficiency. More specifically, for example, a smart city is an urban area that uses different types of electronic IoT sensors to collect data. Observations gained from that data are used to manage assets, resources and services efficiently. The data collected is then used improve the operations across the city. A component of the smart city may be any portion, piece, or entity that uses IoT technology to connect to a network. Those skilled in the art will appreciate that each facility, utility, and agency of a smart city may have a plurality of components that may be affected by a predicted or ongoing hazard. For example, if a city's transportation system is a facility of the smart city, then a component of the transportation system may be a particular metro line or a specific train, bus, etc. This component of the facility may experience a predicted or ongoing hazard that must be dealt with, while the facility as whole (other transportation means of the smart city) continues to function normally and remains unaffected by the detected hazard. Further applications and examples are discussed below.

As shown in FIG. 1, the EHCAS (115) is connected to three types of external entities, namely facilities, utilities, and agencies of a smart city. A facility (113) may be an external entity that provides basic amenities to a city. Facilities (113) may communicate with the EHCAS via a two-way communication. The facilities (113) may be hospitals, police stations, fire stations, emergency operation centers, educational institutions, media outlets of a smart city, a transportation system for the smart city, etc. A component of a hospital facility may be the emergency room (ER), a trauma area, a maternity ward/wing, etc. A component of the transportation system may be a particular bus, metro train, or station.

In one or more embodiments, facilities (113) may communicate with the EHCAS (115) to provide information about natural and man-made hazards that may be ongoing or predicted at the facility (113), and any ongoing or planned progress of a preemptive shutdown of one or more components of the facility (113) to the EHCAS. The EHCAS may communicate a preemptive shutdown plan to affected facilities (113) when necessary. In one or more embodiments, each facility (113) may have a designated preemptive shutdown plan based on the type of facility and the type of hazard detected, or may be part of a collective shutdown plan for the smart city as a whole. Further, when the facility may be divided into components, each component of the facility (113) of the smart city may have its own preemptive shutdown plan or may be a part of a collective shutdown plan for the entire facility (113).

A utility (114) is another type of external entity that provides basic amenities to a smart city. For example, utilities (114) may be a gas utility, a water utility, an electrical utility, a waste/sewage utility, etc. Utilities (114) may communicate with the EHCAS (115) via a two-way communication. Utilities (114) may provide communicate with the EHCAS (115) to provide information about natural and man-made hazards, and progress of any required preemptive shutdown to the EHCAS (115). The EHCAS (115) may communicate a preemptive shutdown plan to affected utilities when necessary. Each utility (114) of the smart city may have its own preemptive shutdown plan or may be part of a collective shutdown plan. Further, when the utility (114) may be divided into components, each component of the utility (114) of the smart city may have its own preemptive shutdown plan or may be a part of a collective shutdown plan for the entire utility (114).

An agency (112) may be an external entity of a smart city that regulates security or safety of the city. For example, the agencies (112) of a smart city may be National Security Agency (NSA), National Cybersecurity Agency (NCA), Metrological Warning Center, World Health Organization (WHO), etc. Agencies (112) communicate with the EHCAS (115) via a two-way communication. Agencies (112) may provide reported information about natural and man-made hazards to the EHCAS (115). In turn, the EHCAS (115) alerts agencies about any new and ongoing hazards within the smart city. In case that a preemptive shutdown initiated by the EHCAS (115) is unsuccessful, the EHCAS is configured to alert the agencies (112) to initiate a manual shutdown.

As noted above, in one of more embodiments, one or more facilities, utilities or agencies may experience a predicted or an ongoing hazard. A hazard may be any event that is an unsafe or a harmful occurrence, or an unsafe or a harmful development of occurrences in one or more external entities. Accordingly, the EHCAS (115) communicates with external entities to determine when these hazards have occurred or may occur based on ongoing operations of the facilities, agencies, and utilities (112, 113, 114).

To this end, the EHCAS (115) includes several modules that are operatively connected and that work together to detect and shutdown one or more components of the external entities (112, 113, 114) to prevent a potential hazard or to address an ongoing hazard. Specifically, in one or more embodiments disclosed herein, the EHCAS (115) includes a core module (100). The core module (100) is the main component for the general processing of data and algorithms that is received by the EHCAS (115). In other words, the core module (100) acts as the CPU of the EHCAS (115) and facilitates communication between all of the other components within the EHCAS. The core module (100) is configured to perform a high level analysis of a hazard. An example of a high level analysis of a hazard may be finding out whether an incident is part of an ongoing hazards alert and whether it is matching a predefined hazards scenario. Although not shown, the core module (100) may include a processor, firmware, and logistical instructions/software to perform the aforementioned functions. In one or more embodiments, the core module (100) triggers other components in the EHCAS (115) system and coordinates their communication, for example, delegating deep analysis of an ongoing hazard to a hazards analytics module (101), instructing a communications module (108) to alert affected agencies, etc.

A hazards analytics module (101), in one or more embodiments disclosed herein, is activated when there is necessity for a deep level analysis of a hazard. The hazard analytic module (101) analyzes data collected from the external entities (112, 113, 114) by the core module (100) to advise if there is an existing hazard or whether a potential hazard may occur, essentially detecting ongoing hazards and predicting potential hazards. The data used by the hazard analytic module (101) may be supplied by one or more repositories, including an active ongoing hazards database (110) and/or a predefined scenarios hazards database (111) stored in a memory (116) of the EHCAS. Additionally or alternatively, data may come from different external data sources, such as for example, agencies' databases, facilities' databases, utilities' databases, etc. The hazards analytics module (101) operates with at least historian data, real time data and forecasted data. This module may also analyze the data based on trends and patterns of events and consequences. The hazards analytics module (101) is described in detail further in FIGS. 2 and 4.

The memory (116) of the EHCAS may be any type of suitable memory, such as persistent storage, RAM, etc.

Continuing with FIG. 1, the EHCAS (115) includes a predefined preemptive shutdown plan module (109), which is a repository that stores shutdown plans that were predefined initially or learned over time by the EHCAS (115) system. The predefined preemptive shutdown module (109) stores the optimal plan for a sequential preemptive shutdown of the affected external entities based on known dependencies of components or entities. The predefined preemptive shutdown plan module (109) may be any type of storage, such as persistent storage, RAM, etc. The predefined preemptive shutdown plans may be entered manually or updated by the core module (100). Preemptive shutdown plans may be developed as a possible theoretical event, simulation of the event that already occurred before introduction into the EHCAS (115), and/or from an event detected by the EHCAS (115).

The preemptive shutdown may be performed in parallel or in sequence. A parallel preemptive shutdown plan may be performed when there is no dependency between affected external entities or components within affected external entities. Additionally or alternatively, parallel shutdown plans may be performed even when the dependency between affected external entities exists, but the preemptive shutdown of dependent elements do not endanger one another. A sequential preemptive shutdown plan may be performed when any dependency between affected external entities exists and when utilizing parallel preemptive shutdown would endanger the preemptive shutdown process. An example of a dependency between facilities may be when facility A cannot be shut down before facility B. In this case, any predefined shutdown plan for facility A will account for shutting facility B down first. The EHCAS (115) may send a shutdown request to facility B and wait until this shutdown is completed before initiating a shutdown of facility A. Then the EHCAS (115) sends another shutdown command to facility A.

In one or more embodiments, a predefined shutdown plan may be based on the type of hazard, the type of external entity of component of an external entity experiencing the hazard or potential hazard, and other considerations such as environmental safety/procedures, commercial building requirements/codes, etc. In one or more embodiments, a shutdown plan may include steps to request multiple facilities to shut down at the same time. Shutting down may involve turning off one or components of an affected external entity or turning off the entire external entity.

The EHCAS (115) also includes a creation of shutdown plans module (102). This module (102), in one or more embodiments disclosed herein, creates a shutdown plan for a situation where no predefined plan is available. The creation of shutdown plan module (102) may be activated after the hazard analytic module (101) processes data regarding an ongoing or a potential hazard and determines that a new preemptive shutdown plan is required for the detected hazard or potential hazard. A new preemptive shutdown plan may be developed by running "what if" scenarios, in order to choose the shutdown scenario with the least impact leveraging the insights shared from the hazards analytics module (101) and predefined hazards scenarios database (111).

The EHCAS (115) also includes several modules that interface and/or communicate with external entities (112, 113, 114) via the core module (100). For example, the alerting module (107) may prepare the alerting or informing messages to the external entities such as the emergency response team, agencies, utilities, facilities, etc. The alerts may be created for a human usage and they may be directed to individuals or teams that are associated with each external entity. Additionally or alternatively, alerts may be created for the systems at the external entities and they may be organized for internal or external systems. The alert module may also send alerting messages to the system admins or the users of the EHCAS itself. An alert may be, for example, a visual alert, a haptic alert, an audio alert, or any other suitable type of alert. A monitor module (106) may monitor the progress of the execution of any shutdown plan and report any deviations of the predefined milestones set forth in the shutdown plan. This module (106) may be activated when a preemptive shutdown plan is in progress for an affected external entity. The monitor module (106) may be configured to update the active ongoing hazards database with the information from the ongoing preemptive shutdown plan.

Possible deviations that may be reported by the monitor module (106) may be based on predefined criteria. In one or more embodiments, the monitor module may be integrated into the external entities, to monitor their status directly.

Additionally or alternatively, the EHCAS (115) may receive messages from the affected external entities (112, 113, 114) and supply the monitoring module (106) with the necessary information. Further, the monitor module (106) may activate an escalation process if there is a deviation that requires further actions or closer attention.

The monitor module (106) may communicate with the alerting module (107) to alert the appropriate entities when deviations from a preemptive shutdown plan occur. In addition, the monitor module (106) is configured to monitor the status of a potential or ongoing hazard. This status may be communicated to the hazards analytics module (101) to determine a severity of the hazard. In other embodiments, the monitor module may also monitor the actual shutdown of one or more components/entities and send the status of the shutdown to the core module (100) for reporting of successful or unsuccessful shutdown.

A user interface (UI) module (103) may enable the system user of the EHCAS (115) to interact with the system. For example a system user may configure the system, provide verifications, supply the system with externally generated data, take-over the control of the system if needed, etc. The user interface module (103) may be a graphical user interface (GUI), a form-based user interface, a natural language user interface, a command line user interface, or any other suitable UI capable of taking input for the EHCAS (115) system.

In one or more embodiments, all the modules discussed above that are part of the EHCAS (115) may be connected with each other through wired connectivity or wireless connectivity. For example, the above-mentioned modules within the EHCAS (115) may be connected via PCB using circuit level or any other circuit configuration that communicates via a bus at motherboard level communications. Additionally or alternatively, the EHCAS (115) may be implemented entirely in software and the communication between a plurality of modules can be distributed over a cloud network, using one or more wireless protocols. For example, communication between EHCAS (115) modules may be performed using an IoT protocol over an IoT link, high speed connectivity such as Ethernet, Fiber Channel, etc.

The communication module (108) of the EHCAS (115) may be a module that facilitates communication between the EHCAS and the external entities. This module may interface with the external entities through wired connectivity or wireless connectivity. For example, wireless connectivity may be achieved with at least: LTE/5G, satellite or narrowband, e.g., NB-IoT, LoraWAN, ISA-100, etc.

Those skilled in the art will appreciate that while FIG. 1 shows all the modules communicating with the core module (100) which then facilitates/transmits collected information to other modules, FIG. 1 is not limited to the configuration shown. For example, one or more modules of the EHCAS may be configured to directly communicate via hardware (PCB connections) or software as described above.

Figure 2:
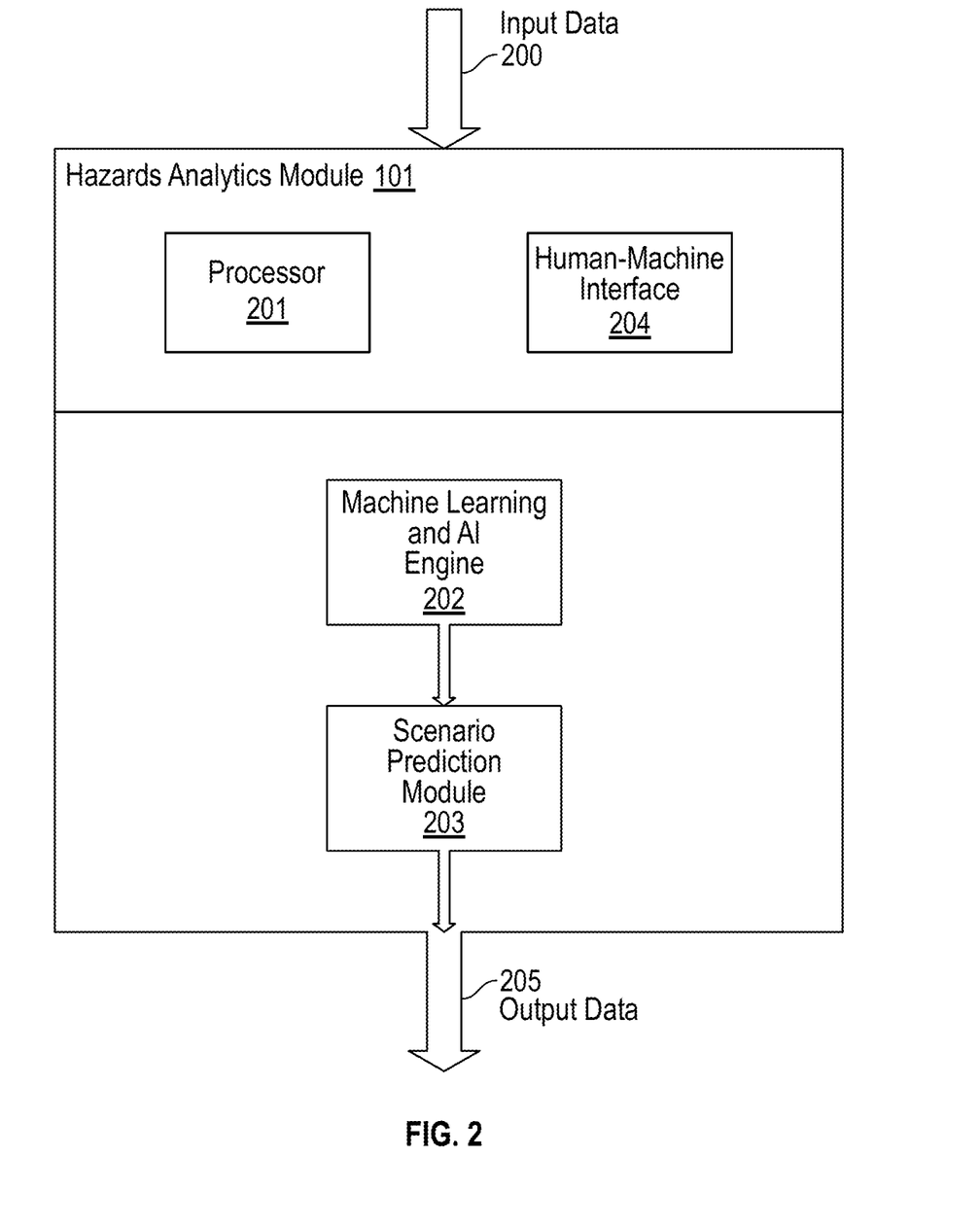
FIG. 2 shows a hazards analytics module of the EHCAS in accordance with one or more embodiments disclosed herein.

FIG. 2 shows an expanded version of the hazards analytics module (101) of the EHCAS in accordance with one or more embodiments disclosed herein. Specifically, FIG. 2 describes a part of the EHCAS system that may perform a deep analysis of input data (200) that may be provided by one or more sources within or outside of the EHCAS. Additionally, the hazards analytics module (101) may, for example assess a hazard and initiate a development of a preemptive shutdown plan to deal with the detected hazard within the smart city.

In one or more embodiments of the disclosure, the hazards analytics module (101) includes a processor (201), a machine learning and artificial intelligence engine (AI) (202) and a scenario prediction module (203), and a human-machine interface (HMI) (204). The processor (201) may be any suitable multi-core or single-core processor, such as a microcontroller unit (MCU) that may be implemented as a system on a chip (SOC). The processor is configured to execute/operate the plurality of modules of the hazards analytics module, such as the AI engine (202). The hazards analytics module, by comprising the processor, may be a separate computing system that is part of the EHCAS. The processor may be selected based on computational requirements required by supported modules. The HMI (204) may be used to supply additional data to the machine learning and AI engine (202).

In one or more embodiments, the input data (200) that is analyzed by the hazards analytics module (101) may originate from a plurality of sources. For example, the input data (200) may be imported/read from the active ongoing hazards database (110), received from the core module or directly from the external entities (112, 113, 114), or entered by a user through a human-machine interface (HMI) (204) of the hazards analytics module (101). For example, the user can add data from an external database, a recommendation of an expert or defined parameters of a criteria. It will be apparent to one of ordinary skill in the art that the interface with external databases or other data sources can be implemented at the software level using API for example.

In one or more embodiments, the machine learning and AI engine (202) processes input data (200) and learns from the input data to produced intelligent output based on the observations and characteristics of detected hazards over time. The machine learning and AI module (202) processes the input data (200) to generate or update the one or more trained models. For example, different types of models may be trained, such as artificial intelligence, convolutional neural networks, deep neural networks, support vector machines, decision trees, inductive learning models, deductive learning models, and supervised learning models, and are capable of approximating solutions of complex non-linear problems. An optimal solution of a plurality of models is based on previously determined parameters. The newly generated or updated AI model and the results of the analysis may be stored into the predefined hazards scenarios database.

The machine learning and artificial engine may be a combination of hardware, firmware, and/or software that perceives its environment and takes actions that maximize its chance of successfully achieving its goals. Additionally, the AI engine (202) learns from the received input and improves itself over time. For example, when a hazard is detected by the EHCAS system, and no predefined shutdown plan exists for the detected hazard, the hazard information may be sent to the machine learning and AI engine (202) in the hazards analytics module (101) to perform a deeper analysis of the criticality, priority, and type of the detected hazard. Based on the information learned from previous hazards experienced by the smart city (historical data), and based on any other input from a user or from the core module (real-time data), the machine learning and AI engine (202) is configured to recommend how best to proceed in dealing with the detected hazard.

In alternate embodiments, the machine learning and AI engine (202) is configured to predict a hazard that has not occurred yet. In this case, forecasted data, such as weather forecasts, may be used by the machine learning and AI engine to predict something that may occur given the current operation of a facility or utility. In one or more embodiments, in predicting hazards, the machine learning and AI engine (202) may analyze trends and patterns of events and consequences. Further, in predicted hazards, the machine learning and AI engine (202) may incorporate data from the active ongoing hazards database and the predefined hazards scenario database.

The machine learning and AI engine (202) reports the information from the deep analysis, in the form of processed data, to the scenario prediction module (203). The scenario prediction module (203) further analyzes the reported information and produces scenario suggestions as output data (205). More specifically, the information provided by the machine learning and AI engine (202) to the scenario prediction module (203) is compared to the information stored in the predefined scenarios database (111). In one or more embodiments, each comparison is rated according to a predefined criteria. For example, the predefined criteria may be a type of disaster in which the hazard occurs, a severity of the disaster, an impacted area of the disaster, a forecasted time of the disaster occurrence, a type of the external entity experiencing the disaster/hazard, a criticality of the external entity to the smart city, a location of the external entity within the smart city, a density of human population at the disaster location, etc. The output data (205) is an insight provided to the creation of shutdown plan module, to formulate a shutdown plan where one does not already exist, based on the ranking according to the predefined criteria.

Figure 3:
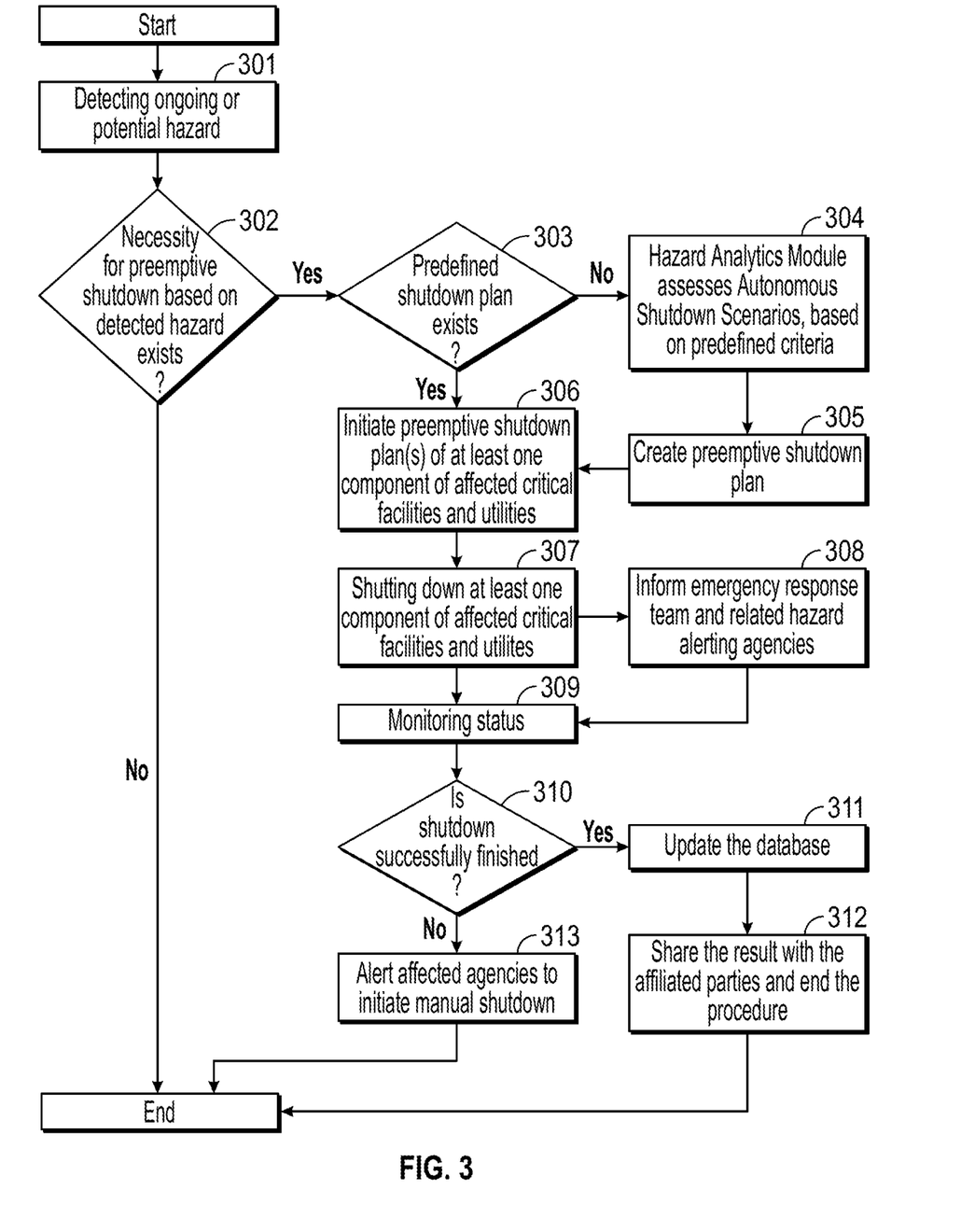
FIG. 3 shows a flow chart for a process of detecting hazards by the EHCAS in accordance with one or more embodiments disclosed herein.

FIG. 3 shows a flowchart describing a method for assessing an occurrence of hazard, in accordance with one or more embodiments of the invention. Further, one or more blocks in FIG. 3 may be performed by one or more components as described in FIG. 1 or FIG. 6A (e.g., computing system 600 including computer processor(s) 602 and communication interface 612). The core module (100) performs the main coordination of the steps in the method described in FIG. 3. The hazards analytics module (101) will perform some steps in this method that require deep analysis. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. The method of FIG. 3 may be used, for example, to assess a hazard and develop a preemptive shutdown plan. Different modules of the method may be executed continuously or triggered by another module. For example, the core module and the communication module may execute continuously in order to support both internal and external communication. Alternatively, the hazards analytics module, the predefined preemptive shutdown plan module, the creation of shutdown plan module, the alerting module, the monitor module and the user interface module may be triggered by, at least, the core module to perform various assigned operations.

In Step 301, data is continuously or periodically collected from the external entities that are equipped with devices connected to EHCAS to detect an ongoing or potential hazard. Information collected in Step 301 may include feeds from other utilities/facilities about their normal operations. By collecting such data, and differentiating between normal operations and anomalies, ongoing or potential hazards may be detected. For example, data collected from a water utility that provides water to the smart city may include the level of sulfur or other chemicals in the water. If a fire alarm goes off in an external entity, the time and cause of the alarm may be collected. Data collected from a refinery may be the amount of pollutants being excreted into the environment. The transportation system of a smart city may provide information about the transportation lines running, any breakdown in any of the trains, busses, or other public transportation, etc. As another example, weather information may be periodically collected to determine whether a storm is approaching that may affect the electrical utilities of a city. If power may be lost, potential hazards may be detected in connection with such a power loss.

Data may be collected by the external entities, but it may also collected from a plurality of devices connected to EHCAS. The collection may occur as scheduled, e.g., based on the time-base provided by the IoT communication protocol overlay or spontaneously, e.g., upon request or when a particular hazard is detected. In one or more embodiments, the detection of a potential or an ongoing hazard is reported to the communications module, which is the interface between the EHCAS and the external entities. The communications module then forwards the notification to the core module.

In Step 302, the core module assesses the occurrence of the hazard. The assessment of the hazard may start with determining if the hazard requires a preemptive shutdown. For example, if the hazard is not a particularly dangerous or imminent threat, preemptive shutdown may not be necessary. Alternatively, when the detected hazard affects the ongoing operation of a facility/agency/utility of the smart city or a component of the facility/agency/utility, preemptive shutdown of one or more components may be required to prevent further damage to the external entity or to the environment, or for safety reasons. The necessity for a preemptive shutdown may be determined by predetermined criteria. For example, preemptive shutdown may be necessary in case of natural disasters, such as an earthquake, a hurricane, a tornado, a flood, a fire, etc. Additionally, preemptive shutdown may be necessary due to the hazards caused by the human-made actions (intentional and/or unintentional) or equipment failures, such as environmental hazards affecting the population around that the external entity. Alternatively, preemptive shutdown may be necessary due to the necessity to preemptively shutdown another external entities or their components, when a dependency relationship exists between entities. When preemptive shutdown is not required (Step 302), the process ends. Alternatively, the process may return to Step 301 in which data continues to be collected from external entities until a next hazard is detected by the system.

When preemptive shutdown of one or more components/external entities is necessary (Step 302), the process moves to Step 303. In Step 303, the hazards analytics module analyzes a potential or ongoing hazard to determine if a predefined preemptive shutdown plan for that hazard exists. In the process of analysis, the core module may activate a predefined preemptive shutdown plan module. The predefined preemptive shutdown plan module compares the potential or ongoing hazard to already predefined or learned plans, stored in a repository. Comparison criteria may be the type of hazard, the location of the hazard, the intensity of the hazard, etc.

When a predefined shutdown plan for the detected hazard does not already exist, in Steps 304 and 305, the potential or ongoing hazard is analyzed to extract the necessary data about the hazard. These steps may be performed by the machine learning and AI engine of the hazards analytics module. The extracted data is forwarded to a creation of shutdown plan module in Step 305 to generate a new shutdown plan for the detected hazard. Specifically, in one or more embodiments, the creation of shutdown plan module may run "what if" scenarios to choose the shutdown scenario with the least impact, leveraging the insights shared from the hazards analytics module and stored in the predefined hazards scenarios database. For example, the new shutdown plan may be a step-by-step procedure that informs the external entity of an order following which one or more parts/components should cease operation. The new shutdown plan may take into account any dependencies that exist and that may affect other components of the external entities or other external entities altogether. In addition, the new shutdown plan may specify the timeframe by which the shutdown should occur. By the completion of Step 305, a new shutdown plan is created to deal with the detected hazard. In one or more embodiments, a shutdown plan contains steps to request a plurality of external entities or their components to cease operation, go into idle/stand-by mode, or completely turn off. The shutdown request may be sent to the external entities' emergency shutdown (ESD) system when the entity is equipped with such a system.

In one or more embodiments, the new shutdown plan created in Step 305 may be verified by a system user or by an external entity such as an agency, for example.

Going back to Step 303 in FIG. 3, when a predefined shutdown plan exists for a detected hazard, or after the new shutdown plan is created, in Step 306, the predefined shutdown plan may be uploaded to the core module, and the core module may take over the implementation of the predefined or new shutdown plan. The core module may obtain verification from the system owner if required and update the active ongoing hazards database accordingly. The core module then initiates the shutdown plan.

In Step 307, a core module may shut down and/or initiate requests to shut down a plurality of external entities or their components. A parallel shutdown may be applicable if there is no dependency between affected external entities. If there is dependency between the external entities or their components, meaning that a shutdown of one external entity (A) or its component will affect a shutdown of another external entity (B) or its components, then EHCAS will sent shutdown request to the external entity B or its components and wait until this shutdown completed. After a shutdown of it will sent another shutdown command to the external entity A or its components. If the facility is equipped with ESD then it is the responsibility of the ESD to coordinate the sequence of shutdown of external entities or their components. Alternatively, if an external entity does not have an ESD in place, then the EHCAS may be preconfigured to handle this function. For example, the EHCAS may interact with the external entities or their components to perform a safe shutdown within the affected external entity. Alternatively, if an external entity does not have an external communication with EHCAS, then EHCAS will request responsible individuals/teams of that external entity to initiate the shutdown.

In Step 308, alerting messages alerting other parts of the smart city of the shutdown are prepared and sent to external entities such as the emergency response team, agencies, utilities and facilities. The alerts may be communicated to individuals or teams, or systems. Alert messages may also be sent to the system admins or the users of the EHCAS.

In parallel with Steps 307-308, in Step 309, the progress of the execution of the plan is monitored and any deviations based on a predefined milestones/criteria are reported to the EHCAS. The affected external entities may report their progress to the monitor module within the EHCAS. Additionally or alternatively, the monitor module may be integrated with external entities to directly receive feeds reflecting the progress. Monitoring the progress of the shutdown plan may include determining whether the requested shutdown sequence is performed in the proper order, determining whether the shutdown is happening within predefined specified timeframe, determining whether overall hazards containment during the emergency has been accomplished successfully; i.e., not exceeding specific loss ratio of life & assets for different natural and man-made scenarios. Deviations from the execution of the shutdown plan may include exceeding the timeframe set out by the plan, unsuccessful shutdown of one or more components/entities, violation of a dependency relationship between entities, etc. Deviations reported may result in a halt of the shutdown plan execution, or may not affect the shutdown plan execution, depending on the severity of the deviation. However, each deviation, no matter how small or large, may be reported and logged by the EHCAS for future learning by the AI of the hazards analytics module.

In Step 310, a determination is made as to whether the shutdown was successful and in accordance with the shutdown plan.

In the case of a successful shutdown, in Steps 311 and 312, when shutdown is successful, a predefined hazards scenarios database is updated with the data from the successful shutdown. Following the update to the database, the result of a successful shutdown is shared with affected external entities.

When shutdown is unsuccessful, in Step 313, affected external entities are alerted regarding the unsuccessful shutdown. Additionally, the EHCAS may alert agencies and affected external entities to initiate a manual shutdown of affected external entities or their components. Those skilled in the art will appreciate that the process of FIG. 3 may be repeated for each detected hazard, and may run in parallel for multiple ongoing or predicted hazards.

Figure 4:
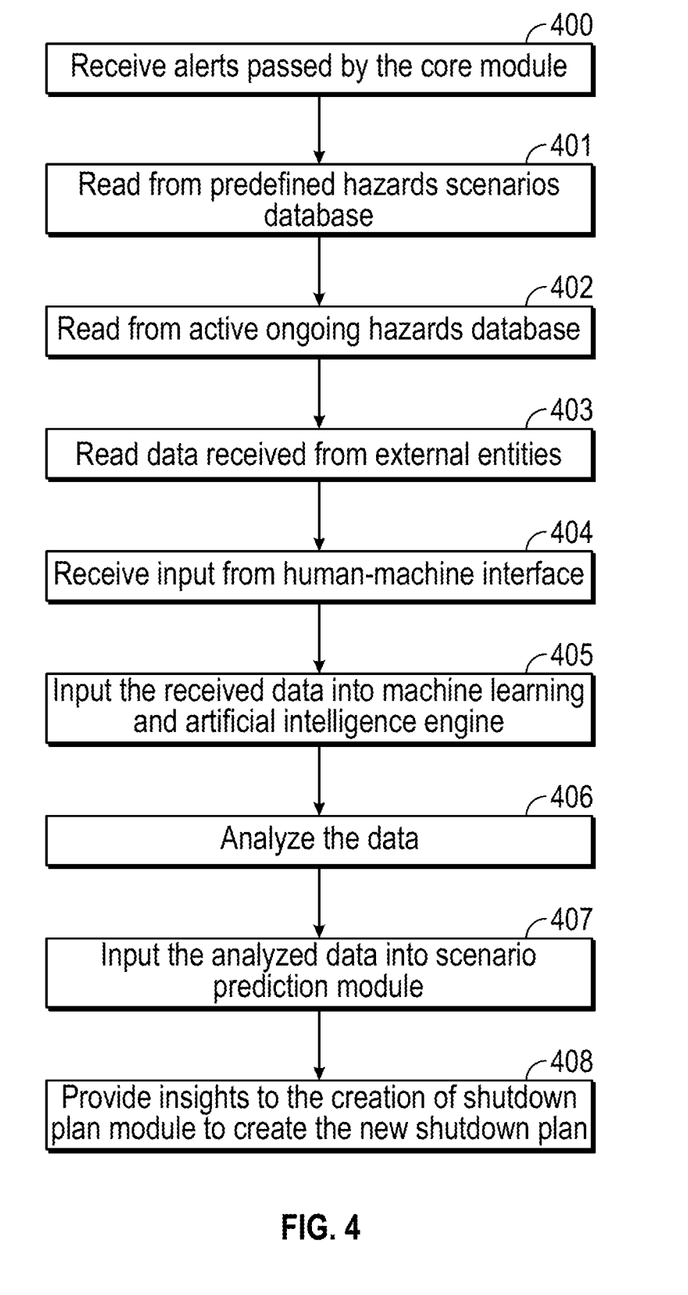
FIG. 4 shows an example flow chart associated with the hazards analytics module in accordance with one or more embodiments disclosed herein.

FIG. 4 depicts a flow chart describing the process of the hazards analytics module in accordance with one or more embodiments. Specifically, FIG. 4 expands on the process involved in Step 304 of FIG. 3. The flow chart of FIG. 4 describes behavior of the hazards analytics module in a potential real life situation. The following use case scenario is intended to provide an example of possible application of the EHCAS, in accordance with one or more embodiments of the invention. The use case scenario is for illustrative purposes only, and the EHCAS is not limited to the application discussed below.

Train Derailment

An example situation in which a smart city may experience a potential hazard is a train derailment, due to the mechanical failure of the train tracks. This would affect at least the transportation facilities of the smart city, and may potentially affect other facilities/utilities of the smart city, depending on the location of the mechanical failure. For example, a potential hazard of a collision may affect another external entity of the smart city. FIG. 4 shows a flowchart that may be implemented by the hazards analytics module of the EHCAS to assess the hazards in the train derailment example scenario.

Initially, the EHCAS may receive an alert (400) either from sensors on the railroad tracks, by the agency, or the EHCAS may intelligently perceive the potential hazard that may occur using the data that is continuously or periodically collected from external entities by the EHCAS. Further, in the case where the train has not derailed as a result of the track failure, the EHCAS may categorize the identified hazard as a predicted hazard. If the train derailment hazard is not part of the predefined hazards scenarios database, the core module triggers the hazards analytics module to perform a deeper analysis and determine the best way to handle the detected hazard.

The hazards analytic module requires input to produce the solution. As described above, the source of input may be the predefined hazards scenarios database (401) and/or active ongoing hazards database (402) from which the hazards analytics module reads stored data and obtain historical data on past hazards with similar parameters as the current, identified hazard. If train derailment scenarios previously have occurred in the smart city for example, then the predefined hazards scenarios database may include information on how the hazard was previously dealt with. For example, perhaps the scenarios previously stored indicate to check whether the sensor is accurately reporting the mechanical failure or providing false information, and then if the sensor is accurate, perhaps train(s) taking the faulty track were removed from circulation.

Additionally, or when no predefined hazards scenario exists for the identified hazard, the external entities (403) or the system user (404) may have data, requirements or limitations to supply to the hazards analytics module. For example, perhaps the transportation agency provides maps for rerouting of the trains to avoid the faulty train track. The hazards analytic module imports available data into the machine learning and AI engine (405).

Continuing with FIG. 4, the machine learning and AI engine analyses the data (406) from the various input sources and forwards the result to the scenario prediction module. The scenario prediction module compares the hazard to the predefined hazard scenarios database (407) and based on analysis of comparisons, it provides insight to the creation of shutdown plan module (408) to create a new shutdown plan for the transportation agency to implement to avoid the potential hazard of train derailment.

With the train derailment example, with Steps 406-408, the AI engine may take information in to account such as how many passengers ride the particular route that is experiencing the mechanical failure, how long would it take technicians to fix the mechanical failure, how dangerous/imminent is train derailment due to the failure, etc. These parameters determine whether the identified hazard requires preemptive action, the time-sensitively of any existing or created shutdown plan, and the order in which steps must be taken to mitigate the hazard.

Those skilled in the art will appreciate that the process of FIGS. 3 and 4 may be implemented for a variety of example scenarios for which an ongoing or potential hazard may be identified by the EHCAS. As noted above, slight differences in procedures may occur depending on how the hazard is identified: (1) when the hazard is identified by the EHCAS itself; (2) when the hazard is identified by an agency such as the NSA or NCA; and (3) when the process of hazard identification is triggered by a facility or utility.

The following examples provide additional applications of embodiments disclosed herein.

Power Utilities

For example, consider the scenario in which a smart city is being served by two Power Utilities operating at their maximum capacity. This level of operation is normal when each utility is considered by itself, but it is not normal for power utilities to operate at the same time at maximum capacity. The EHCAS performs the analysis and concludes that such a trend may lead to a double failure causing a blackout of the smart city, if the situation is left without any preemptive mitigation action. Hence EHCAS may issue a directive to the utility to reduce the operating level by shutting down some parts of one or both of the power facilities.

Hydrocarbon Facility

For example, suppose that a hydrocarbon facility is planning to produce a certain amount of polymers, but this amount will cause a $CO_2$ emission to increase. It is planned to have a big event in this city in the same timeframe where a lot of trucks and cars will come to the city. The EHCAS performs the analysis and concludes that the combined $CO_2$ emission will exceed the threshold of the greenhouse limit. This may cause the EHCAS to issue a directive to the facility to reduce the emission by shutting down some parts of the facility.

Figure 5:
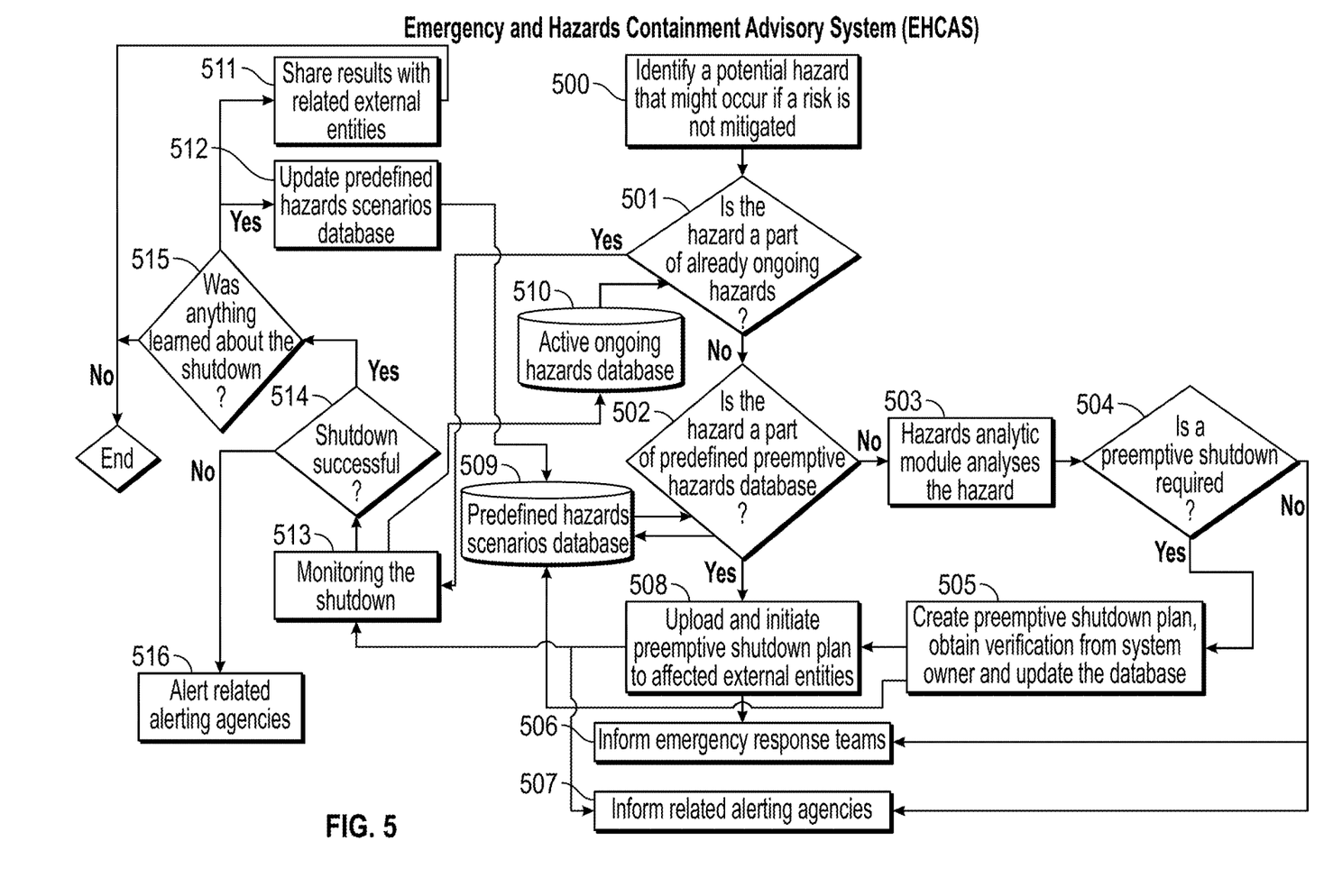
FIG. 5 shows an example process in accordance with one or more embodiments disclosed herein.

FIG. 5 illustrates a flowchart for an example where shutdown is activated by EHCAS itself. The situation of FIG. 5 is applicable where the external entities do not encounter hazards and no alerts come from other agencies. In this scenario, the hazard is detected by the modules in the EHCAS that may identify a potential emergency that might occur if the external entities continue operating in the same manner (Step 500). That conclusion is perceived from continuously analyzing data from a plurality of the entities and correlating them to the previously analyzed patterns. Those skilled in the art will appreciate that FIG. 5 illustrates the process in a practical application and the steps performed may be in a different order than that discussed above in FIG. 3.

In Step 501, a determination is made as to whether the hazard is already a part of the active ongoing hazards database (510). If the hazard is already the part of the active ongoing hazards database that means that the hazard has been addressed by the system and that it is not necessary to restart the process. Alternatively, if the hazard is not part of the active ongoing hazards database (510), the process of assessing the hazard is initiated.

In Step 502, a determination is made as to whether the hazard is already part of the preemptive hazards scenarios database. The preemptive hazards scenarios database (509) stores scenarios that the EHCAS has already addressed. If a current hazard has been previously addressed, the EHCAS will use the same shutdown plan. However, if it is the first occurrence of the hazard, the hazard analytics module is activated to perform a deeper analysis.

In Step 503, the hazards analytics module analyzes the hazard using the AI engine to determine specific characteristics of the hazard including the type of hazard, the severity of the hazard, and the location of the hazard. Additionally, the hazards analytics module provides insights regarding the hazard to the creation of shutdown plan module.

In Step 504, a determination is made as to whether the hazard requires a preemptive shutdown. If the hazard requires preemptive shutdown, the creation of a shutdown plan module is activated. If the hazard does not require preemptive shutdown, necessary agencies/authorizes are alerted as to the nature of the hazard (Step 507), but no further action is undertaken to deal with the identified hazard. For example, when the identified hazard does not require shutdown, the hazard-related information is forwarded to the external entities such as alerting one or more agencies (Step 507) and emergency response teams (Step 506).

In Step 505, the creation of shutdown plan module creates a shutdown plan and, if necessary, requests the permission from the system owners before the initiation. Additionally, the active ongoing hazards database is updated with the specific scenario of the current identified hazard.

In Step 508, when a preemptive shutdown plan exists or is created (Step 505), the preemptive shutdown plan is uploaded and initiated in one or more affected external entities. After the shutdown plan is initiated, the monitoring module starts to monitor the development of the shutdown (Step 513). Additionally, the affected external entities are alerted about the initiation of the shutdown plan.

In Step 514, a determination is made as to whether the one or more external entities or their components have been successfully shut down. If the shutdown has been unsuccessful the emergency response team would be alerted to initiate a manual shutdown (Step 516).

Upon successful shutdown following procedures in the shutdown plan, in Step 515, a determination is made as to whether anything has been learned after the successful shutdown. If the system possesses new information about the scenario, the predefined hazards scenarios database (509) is updated (Step 512) and the results are shared with the related external entities (Step 511).

Embodiments may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, various portions of the EHCAS, such as the hazards analytics module, may be implemented on a node of a distributed system that is connected to other nodes. By way of another example, the EHCAS or the hazards analytics module on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:
1. A method comprising:
detecting a hazard at one of a plurality of entities based on collected information from the plurality of entities of a smart city using an Internet of Things (IoT) network;

determining, by a computer processor, whether the detected hazard requires preemptive shutdown of at least one component of one of the plurality of entities at which the hazard is detected;

determining, by the computer processor, whether a predefined shutdown plan exists for the detected hazard at the one of the plurality of entities;

when the predefined shutdown plan does not exist, generating, by the computer processor, a new shutdown plan, based on predefined criteria, for the detected hazard at the one of the plurality of entities;

shutting down, by the computer processor, the at least one component of the one of the plurality of entities based on the new shutdown plan or the predefined shutdown plan; and monitoring and reporting, by the computer processor, a status of the shutdown of the at least one component, wherein the plurality of entities includes a plurality of facility plants and a plurality of utility plants.

2. The method of claim 1, wherein the hazard is an ongoing hazard or a predicted hazard based on the collected information.

3. The method of claim 1, the method further comprising: alerting the one of the plurality of entities of the detected hazard.

4. The method of claim 1, reporting, to the one of the plurality of entities, of the successful shutdown of the at least one component.

5. The method of claim 1, updating a database of predefined shutdown plans with the new shutdown plan created for the detected hazard at the one of the plurality of entities.

6. The method of claim 5, wherein the plurality of entities comprise at least one selected from the group consisting of: a smart city utility, a smart city facility, and an agency.

7. The method of claim 1, wherein the predefined criteria at least one selected from the group consisting of: a type of disaster, a severity of the disaster, an area of the disaster, a forecasted time of disaster occurrence, a type of the at least one entity experiencing the hazard, a criticality of the facility or utility, a timeframe associated with the detected hazard, a location of the at least one entity, and a population density and distribution of a location of the disaster.

8. The method of claim 1, further comprising: updating a predefined hazards scenario database with the detected hazard; and when a predefined shutdown plan exists, uploading and implementing the predefined shutdown plan.

9. The method of claim 1, wherein shutting down the at least one component comprises:

when the at least one entity is equipped with ESD, requesting the ESD to execute the new or pre-defined shutdown plan;

executing the new or pre-defined shutdown plan directly, when the at least one entity is not equipped with ESD; and placing the at least one component in idle/stand-by mode or turning off the at least one component.

10. A system for monitoring a plurality of entities of a smart city, comprising:

an Internet of Things (IoT) network; and a processor coupled to a memory; the processor configured to:

collect data from a plurality of external entities outside of the system using the Internet of Things (IoT) network;

detect and identify a hazard in one of the plurality of entities based on the collected data; and create a new shutdown plan based on predefined criteria, when a predefined shutdown plan is unavailable for the identified hazard, wherein the system is configured to shutdown at least one component in the one of the plurality of entities in which the hazard is identified, wherein the system is configured to monitor and report a status of the shutdown of the at least one component, and wherein the plurality of entities includes a plurality of facility plants and a plurality of utility plants.

11. The system according to claim 10, wherein the external entities comprise utilities, facilities, and agencies of the smart city.

12. The system according to claim 10, wherein the memory is configured to:

store previously used and predefined shutdown plans;

store data regarding ongoing hazards; and store previously encountered hazards scenarios.

13. The system according to claim 10, wherein the processor is configured to facilitate communication of the system with the plurality of external entities through wired or wireless connections.

14. The system according to claim 13, wherein wireless connections comprise at least one selected from the group consisting of: 5G, LTE, narrowband Internet of Things (NB-IoT), LoraWAN, and ISA-100.

15. The system according to claim 10, wherein the processor is configured to monitor the progress of the execution of the predefined or new shutdown plan and report any deviations from the predefined or new shutdown plan.

16. The system according to claim 10, wherein the hazards analytics module comprises:

a processor;

an artificial intelligence (AI) engine for performing a deep analysis comprising analyzing trends, using historical data and forecasted data to create the new shutdown plan for the identified hazard; and a human-machine interface for input into the AI engine, wherein the new shutdown plan comprises an order of steps to be undertaken to shutdown the at least one component of the one of the plurality of entities, and a timeframe for completion of the new shutdown plan.

17. A non-transitory computer readable medium comprising program instructions, that when executed, are configured to perform a method for monitoring a plurality of entities of a smart city, the method comprising:

detecting a hazard based on collected information from a plurality of entities of a smart city using an Internet of Things (IoT) network;

determining whether the detected hazard requires preemptive shutdown of at least one component of one of the plurality of entities at which the hazard is detected;

when preemptive shutdown is required:

determining whether a predefined shutdown plan exists for the detected hazard at the one of the plurality of entities;

when the predefined shutdown plan does not exist, generating a new shutdown plan, based on predefined criteria, for the detected hazard at the one of the plurality of entities;

shutting down the at least one component of the one of the plurality of entities by following a procedure laid out in the new shutdown plan or the predefined shutdown plan; and monitoring and reporting a status of the shutdown of the at least one component, wherein the plurality of entities includes a plurality of facility plants and a plurality of utility plants.

18. The non-transitory computer readable medium of claim 17, the further comprising instructions for: alerting the one of the plurality of entities of the detected hazard.

19. The non-transitory computer readable medium of claim 17, reporting, to the one of the plurality of entities, of the successful shutdown of the at least one component.

20. The non-transitory computer readable medium of claim 17, updating a database of shutdown plans with the new shutdown plan created for the detected hazard at the one of the plurality of entities.

\* \* \* \* \*